US012453505B2

(12) United States Patent
Trayanova et al.

(10) Patent No.: US 12,453,505 B2
(45) Date of Patent: Oct. 28, 2025

(54) INTRAPROCEDURAL AUTOMATED SYSTEM FOR LOCALIZING IDIOPATHIC VENTRICULAR ARRHYTHMIA ORIGINS

(71) Applicant: THE JOHNS HOPKINS UNIVERSITY, Baltimore, MD (US)

(72) Inventors: Natalia Trayanova, Baltimore, MD (US); Shijie A. Zhou, Baltimore, MD (US); Jonathan Chrispin, Baltimore, MD (US); John Sapp, Halifax (CA); Amir Abdelwahab, Halifax (CA)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 348 days.

(21) Appl. No.: 18/041,506

(22) PCT Filed: Aug. 5, 2021

(86) PCT No.: PCT/US2021/044684
§ 371 (c)(1),
(2) Date: Feb. 13, 2023

(87) PCT Pub. No.: WO2022/039938
PCT Pub. Date: Feb. 24, 2022

(65) Prior Publication Data
US 2023/0363689 A1 Nov. 16, 2023

Related U.S. Application Data

(60) Provisional application No. 63/068,099, filed on Aug. 20, 2020.

(51) Int. Cl.
*A61B 5/367* (2021.01)
*A61B 5/366* (2021.01)
*A61B 18/00* (2006.01)

(52) U.S. Cl.
CPC .............. *A61B 5/367* (2021.01); *A61B 5/366* (2021.01); *A61B 2018/00351* (2013.01); *A61B 2018/00577* (2013.01)

(58) Field of Classification Search
CPC ........... A61B 2018/00351; A61B 2018/00357; A61B 2018/00577; A61B 5/0036;
(Continued)

(56) References Cited

U.S. PATENT DOCUMENTS 6,658,285 B2 12/2003 Potse et al.
2014/0163395 A1 6/2014 Sapp et al.

OTHER PUBLICATIONS

Kazak, E. (Authorized officer), International Search Report and Written Opinion issued in corresponding International Application No. PCT/US2021/044684 mailed on Oct. 28, 2021, 6 pages.
(Continued)

*Primary Examiner* — Thomas Mcevoy
(74) *Attorney, Agent, or Firm* — MH2 Technology Law Group LLP

(57) ABSTRACT

Intraprocedural techniques for identifying a location of an origin of an idiopathic ventricular arrhythmia in a patient are presented. The techniques include acquiring an at least partial electroanatomical geometry; acquiring an electrocardiogram segment of the idiopathic ventricular arrhythmia; calculating at least one integral of the electrocardiogram segment; acquiring a plurality of pacing site sets of coordinates; acquiring a plurality of pacing electrocardiogram segments of the patient; calculating at least one pacing integral; relating each pacing site set of coordinates to at least one corresponding pacing integral, such that a plurality of coefficients are obtained; determining an estimated set of coordinates of the origin of the idiopathic ventricular arrhythmia based on at least one integral of the electrocardiogram segment and on the plurality of coefficients; pro-
(Continued)

jecting the estimated set of coordinates of the origin on to the at least partial electroanatomical geometry to obtain a map; and providing the map.

20 Claims, 7 Drawing Sheets

(58) Field of Classification Search
CPC ......... A61B 5/349; A61B 5/366; A61B 5/367; A61B 5/7242
See application file for complete search history.

(56) References Cited

OTHER PUBLICATIONS

Wang Yong PhD et al. Noninvasive Electroanatomic Mapping of Human Ventricular Arrhythmias Using ECG Imaging (ECGI). Sci Transl Med. Aug. 31, 2011; 3(98): 98ra84, p. 3.
Adam J. Graham MD et al. Evaluation of ECG Imaging to Map Hemodynamically Stable and Unstable Ventricular Arrhythmias. Circ Arrhythm Electrophysiol. 13:e007377. DOI: 10.1161/CIRCEP. 119.007377. Feb. 2020.
Babken Asatryan MD PhD et al. Man vs machine: Performance of manual vs automated electrocardiogram analysis for predicting the chamber of origin of idiopathic ventricular arrhythmia. Wiley Periodicals, Inc. Dec. 2019.
Brian P. Betensky MD et al. The V2 Transition Ratio. A New Electrocardiogramarion for Distinguishing Left From Right Ventricular Outflow Tract Tachycardia Origin. Journal of the American College of Cardiology. Elsevier Inc. vol. 57, No. 22, 2011.
Damir Erkapic MD et al. Ablation of Premature Ventricular Complexes Exclusively Guided by Three-Dimensional Noninvasive Mapping. Card Electrophysiol Clin 7 (2015) 109-115. Elsevier Inc. 2015.
Edmond M. Cronin et al. 2019 HRS/EHRA/APHRS/LAHRS expert consensus statement on catheter ablation of ventricular arrhythmias. European Society of Cardiology. Elsevier Inc./Oxford University Press/Wiley. Europace (2019) 21, 1143-1144. 2019.
Elena Efimova MD et al. Differentiating the origin of outflow tract ventricular arrhythmia using a simple, novel approach. Department of Electrophysiology, Heart Center. Heart Rhythm Society. 2015.
Erik Wissner et al. Noninvasive epicardial and endocardial mapping of premature ventricular contractions. Oxford University Press. European Society of Cardiology. 2016.
Frank Bogun MD et al. Spatial resolution of pace mapping of idiopathic ventricular tachycardia/ectopy originating in the right ventricular outflow tract. University of Michigan Medical Center. Heart Rhythm Society. 2008.
John L. Sapp MD et al. Real-Time Localization of Ventricular Tachycardia Origin From the 12-Lead Electrocardiogram. Clinical Electrophysiology. The American College of Cardiology Foundation. vol. 3, No. 7. Elsevier. 2017.
Josselin Duchateau MD MSc et al. Performance and limitations of noninvasive cardiac activation mapping. Bordeaux University Hospital. Elsevier Inc. Heart Rhythm Society. 2018.
Jurgen G.C. Kemmelings et al. Automatic QRS Onset and Offset Detection for Body Surface QRS Integral Mapping of Ventricular Tachycardia. IEEE Transactions on Biomedical Engineering, vol. 11, No. 9. Sep. 1993.
Kyoung-Min Park MD PhD et al. Using the Surface Electrocardiogram to Localize the Origin of Idiopathic Ventricular Tachycardia. Wiley Periodicals, Inc. Dec. 2012.
Larraitz Gaztanaga et al. Mechanisms of Cardiac Arrhythmias. Sociedad Espanola de Cardiologia. Elsevier Espana, S. L. 2011.
Rajeev K. Pathak MBBS PhD et al. Catheter Ablation of Idiopathic Ventricular Arrhythmias. Heart, Lung and Circulation (2019) 28, 102-109. Australian and New Zealand Society of Cardiac and Thoracic Surgeons (ANZSCTS) and the Cardiac Society of Australia and New Zealand (CSANZ). Elsevier B.V. 2018.
Sachiko Ito MD et al. Development and Validation of an ECG Algorithm for Identifying the Optimal Ablation Site for Idiopathic Ventricular Outflow Tract Tachycardia. Division of Cardiology, Gunma Prefectural Cardiovascular Center. Aug. 2003.
Shahnaz Jamil-Copley MRCP et al. Noninvasive electrocardiogramapping to guide ablation of outflow tract ventricular arrhythmias. Department of Cardiac Electrophysiology, St. Mary's and Hammersmith Hospitals, Imperial College NHS Healthcare Trust. Heart Rhythm Society. 2014.
Shijie Zhou MASc et al. Localization of ventricular activation origin using patient-specific geometry: Preliminary results. J Cardiovasc Electrophysiol. 29:979-986. Wiley Periodicals, Inc. 2018.
Shijie Zhou PhD et al. Automated intraprocedural localization of origin of ventricular activation using patient-specific computed tomographic imaging. Alliance for Cardiovascular Diagnostic and Treatment Innovation, Institute of Computational Medicine, Johns Hopkins University. Heart Rhythm Society. 2019.
Shijie Zhou PhD et al. Prospective Assessment of an Automated Intraprocedural 12-Lead ECG-Based System for Localization of Early Left Ventricular Activation. Circ Arrhythm Electrophysiol. 13:e008262. DOI: 10.1161/CIRCEP.119.008262. Jul. 2020.
Srinivas R. Dukkipati MD et al. Catheter Ablation of Ventricular Tachycardia in Structurally Normal Hearts. Journal of the American College of Cardiology. Elsevier. vol. 70, No. 23, 2017.
Stephan Hohmann MD et al. Spatial Accuracy of a Clinically Established Noninvasive Electrocardiogramaging System for the Detection of Focal Activation in an Intact Porcine Model. Circ Arrhythm Electrophysiol. 12:e007570. DOI: 10.1161/CIRCEP.119. 007570. American Heart Association, Inc. Nov. 2019.
Takumi Yamada et al. Anatomical Consideration in Catheter Ablation of Idiopathic Ventricular Arrhythmias. Division of Cardiovascular Disease. Radcliffe Cardiology. 2016.
Yasuhiro Shirai MD et al. Catheter ablation of premature ventricular complexes with low intraprocedural burden guided exclusively by pace-mapping. Division of Cardiovascular Medicine. Wiley Periodicals, Inc. Aug. 5, 2019.
Doherty, F. (Authorized officer), International Preliminary Report on Patentability issued in corresponding International Application No. PCT/US2021/044684 mailed on Mar. 2, 2023, 6 pages.

INTRAPROCEDURAL AUTOMATED SYSTEM FOR LOCALIZING IDIOPATHIC VENTRICULAR ARRHYTHMIA ORIGINS

CROSS-REFERENCE TO RELATED APPLICATIONS

This application is the national stage entry of International Patent Application No. PCT/US2021/044684, filed on Aug. 5, 2021, and published as WO 2022/039938 A1 on Aug. 20, 2022, which claims the benefit of U.S. Provisional Patent Application Ser. No. 63/068,099, filed on Aug. 20, 2020, both of which are hereby incorporated by reference herein in their entireties.

GOVERNMENT LICENSE RIGHTS

This invention was made with government support under contract R01HL142496 awarded by the National Heart, Lung, and Blood Institute/NIH/DHHS. The government has certain rights in the invention.

FIELD

This disclosure relates generally to computer-aided identification of locations of origin of cardiac arrhythmias.

BACKGROUND

In general, known intraprocedural automated site-of-origin localization techniques require complete electroanatomic maps and are limited to identifying the origin of early left ventricular activation. However, such techniques have limitations, as they cannot identify the site of origin in the right ventricle, for example. In addition, such techniques require complete electroanatomic maps before the procedure commences. Thus, prior site-of-origin localization techniques are limited by the need for pre-procedural cardiac imaging, the need to obtain complete electroanatomic maps, and the inability to localize certain intracardiac structures and vessels.

SUMMARY

According to various embodiments, an intraprocedural method of identifying a location of an origin of an idiopathic ventricular arrhythmia in a patient is presented. The method includes acquiring an at least partial electroanatomical geometry of the patient; acquiring an electrocardiogram segment of the idiopathic ventricular arrhythmia of the patient; calculating at least one integral of the electrocardiogram segment of the idiopathic ventricular arrhythmia; acquiring a plurality of pacing site sets of coordinates obtained by an intracardiac instrument for the patient; acquiring a plurality of pacing electrocardiogram segments of the patient, each pacing site set of coordinates of the plurality of pacing site sets of coordinates corresponding to at least one pacing electrocardiogram segment of the plurality of pacing electrocardiogram segments; calculating at least one pacing integral for each of the pacing electrocardiogram segments of the plurality of pacing electrocardiogram segments, such that each pacing site set of coordinates of the plurality of pacing site of sets coordinates corresponds to at least one pacing integral; relating each pacing site set of coordinates of the plurality of pacing site sets of coordinates to at least one corresponding pacing integral, such that a plurality of coefficients are obtained; determining an estimated set of coordinates of the origin of the idiopathic ventricular arrhythmia based on at least one integral of the electrocardiogram segment of the idiopathic ventricular arrhythmia of the patient and on the plurality of coefficients; projecting the estimated set of coordinates of the origin of the idiopathic ventricular arrhythmia on to the at least partial electroanatomical geometry of the patient, such that a map of a location of the origin of the idiopathic ventricular arrhythmia is obtained; and providing the map of a location of the origin of the idiopathic ventricular arrhythmia.

Various optional features of the above embodiments include the following. The acquiring the plurality of pacing electrocardiogram segments of the patient may include acquiring the plurality of pacing electrocardiogram segments obtained using only three electrocardiogram leads. The only three electrocardiogram leads may be one of: a III lead, a V2 lead, and a V6 lead; or a III lead, a V1 lead, and V4 lead; or Frank leads X, Y, Z. The acquiring the plurality of sets of pacing site sets of coordinates may include acquiring no more than five pacing site sets of coordinates. The method may further include ablating the origin of the idiopathic ventricular arrhythmia based on at least the map of the origin of the idiopathic ventricular arrhythmia. The method may further include: acquiring a second plurality of pacing site sets of coordinates for the patient, the second plurality of pacing site sets of coordinates including a set of coordinates corresponding to the estimated set of coordinates of the origin of the idiopathic ventricular arrhythmia; acquiring a second plurality of pacing electrocardiogram segments for the patient, each pacing site set of coordinates of the second plurality of pacing site sets of coordinates corresponding to at least one pacing electrocardiogram segment of the second plurality of pacing electrocardiogram segments; calculating a second pacing integral for each of the pacing electrocardiogram segments of the second plurality of pacing electrocardiogram segments, such that each pacing site set of coordinates of the second plurality of pacing site sets of coordinates corresponds to at least one second pacing integral; relating each of the pacing site sets of coordinates of the second plurality of pacing site sets of coordinates to a corresponding second pacing integral, such that a plurality of second coefficients are obtained; determining a second estimated set of coordinates of the origin of the idiopathic ventricular arrhythmia based on the integral of the electrocardiogram segment of the idiopathic ventricular arrhythmia and the second plurality of coefficients; projecting the second estimated set of coordinates of the origin of the idiopathic ventricular arrhythmia onto the at least partial electroanatomical geometry of the patient, such that a second map of the origin of the idiopathic ventricular arrhythmia is obtained; and providing the second map of the origin of the idiopathic ventricular arrhythmia. The origin of the idiopathic ventricular arrhythmia may be in a right ventricle of the patient. The acquiring the at least partial electroanatomical geometry may include acquiring the at least partial electroanatomical geometry intraprocedurally. The calculating the at least one pacing integral for each of the pacing electrocardiogram segments of the plurality of pacing electrocardiogram segments may include calculating at least one 120-ms QRS integral for each of the pacing electrocardiogram segments of the plurality of pacing electrocardiogram segments. The relating may include modeling using multiple regression.

According to various embodiments, a system for intraprocedurally identifying a location of an origin of an idiopathic ventricular arrhythmia in a patient is presented. The system includes electronic persistent storage and at least one electronic processor communicatively coupled to the electronic persistent storage, the electronic persistent storage including instructions that, when executed by the at least one electronic processor, configure the at least one electronic processor to perform operations including: acquiring an at least partial electroanatomical geometry of the patient; acquiring an electrocardiogram segment of the idiopathic ventricular arrhythmia of the patient; calculating at least one integral of the electrocardiogram segment of the idiopathic ventricular arrhythmia; acquiring a plurality of pacing site sets of coordinates obtained by an intracardiac instrument for the patient; acquiring a plurality of pacing electrocardiogram segments of the patient, each pacing site set of coordinates of the plurality of pacing site sets of coordinates corresponding to at least one pacing electrocardiogram segment of the plurality of pacing electrocardiogram segments; calculating at least one pacing integral for each of the pacing electrocardiogram segments of the plurality of pacing electrocardiogram segments, such that each pacing site set of coordinates of the plurality of pacing site of sets coordinates corresponds to at least one pacing integral; relating each pacing site set of coordinates of the plurality of pacing site sets of coordinates to at least one corresponding pacing integral, such that a plurality of coefficients are obtained; determining an estimated set of coordinates of the origin of the idiopathic ventricular arrhythmia based on at least one integral of the electrocardiogram segment of the idiopathic ventricular arrhythmia of the patient and on the plurality of coefficients; projecting the estimated set of coordinates of the origin of the idiopathic ventricular arrhythmia on to the at least partial electroanatomical geometry of the patient, such that a map of a location of the origin of the idiopathic ventricular arrhythmia is obtained; and providing the map of a location of the origin of the idiopathic ventricular arrhythmia.

Various optional features of the above embodiments include the following. The acquiring the plurality of pacing electrocardiogram segments of the patient may include acquiring the plurality of pacing electrocardiogram segments obtained using only three electrocardiogram leads. The only three electrocardiogram leads may be one of: a III lead, a V2 lead, and a V6 lead; or a III lead, a V1 lead, and V4 lead; or Frank leads X, Y, Z. The acquiring the plurality of sets of pacing site sets of coordinates may include acquiring no more than five pacing site sets of coordinates. The system may further include a pace mapping system configured to ablate the origin of the idiopathic ventricular arrhythmia based on at least the map of the origin of the idiopathic ventricular arrhythmia. The operations may further include: acquiring a second plurality of pacing site sets of coordinates for the patient, the second plurality of pacing site sets of coordinates including a set of coordinates corresponding to the estimated set of coordinates of the origin of the idiopathic ventricular arrhythmia; acquiring a second plurality of pacing electrocardiogram segments for the patient, each pacing site set of coordinates of the second plurality of pacing site sets of coordinates corresponding to at least one pacing electrocardiogram segment of the second plurality of pacing electrocardiogram segments; calculating a second pacing integral for each of the pacing electrocardiogram segments of the second plurality of pacing electrocardiogram segments, such that each pacing site set of coordinates of the second plurality of pacing site sets of coordinates corresponds to at least one second pacing integral; relating each of the pacing site sets of coordinates of the second plurality of pacing site sets of coordinates to a corresponding second pacing integral, such that a plurality of second coefficients are obtained; determining a second estimated set of coordinates of the origin of the idiopathic ventricular arrhythmia based on the integral of the electrocardiogram segment of the idiopathic ventricular arrhythmia and the second plurality of coefficients; projecting the second estimated set of coordinates of the origin of the idiopathic ventricular arrhythmia onto the at least partial electroanatomical geometry of the patient, such that a second map of the origin of the idiopathic ventricular arrhythmia is obtained; and providing the second map of the origin of the idiopathic ventricular arrhythmia. The origin of the idiopathic ventricular arrhythmia may be in a right ventricle of the patient. The acquiring the at least partial electroanatomical geometry may include acquiring the at least partial electroanatomical geometry intraprocedurally. The calculating the at least one pacing integral for each of the pacing electrocardiogram segments of the plurality of pacing electrocardiogram segments may include calculating at least one 120-ms QRS integral for each of the pacing electrocardiogram segments of the plurality of pacing electrocardiogram segments. The relating may include modeling using multiple regression.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
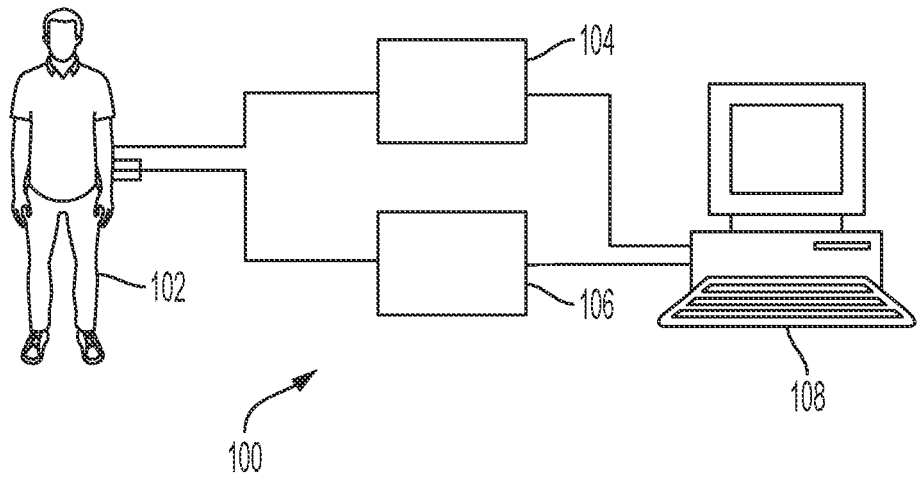
FIG. 1 is a schematic diagram of an intraprocedural automated system for localizing idiopathic ventricular arrhythmia origins according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Idiopathic ventricular arrhythmias (IVAs), including idiopathic ventricular tachycardias (IVTs) and premature ventricular complexes (PVCs), occur frequently in patients without apparent clinical structural heart disease. IVAs are thought to be caused by triggered activity and to originate in a variety of areas within the ventricles and the neighboring vessels. Catheter ablation is an effective treatment. Three-dimensional (3D) electroanatomic mapping to accurately identify critical sites of origin is very helpful for the success of IVA ablation. A number of twelve-lead electrocardiogram (ECG) algorithms and non-invasive ECG imaging approaches have been used to pre-procedurally predict IVA source sites. However, using twelve-lead ECG algorithms to interpret the IVA origin sites or chamber of interest may provide insufficient spatial resolution and accuracy, resulting in need for frequent ectopy to combine activation mapping. The localization accuracy of ECGI is moderate; quantitative clinical assessment of ECGI for localizing the site of origin of PVCs/IVTs has been challenging. Thus, improved techniques for automated IVA origin localization are desirable.

Some embodiments provide intraprocedural techniques for automated localization of IVA origins. Some embodiments localize IVA origins on the patient-specific geometry of left ventricle, right ventricle, neighboring vessels (e.g., aortic root) and papillary muscles. Thus, some embodiments are capable of localizing IVA origins in locations in which known techniques are not possible. Some embodiments combine three-lead (e.g., leads III, V2, V6), 120-ms QRS integrals with pace mapping to predict the site of earliest ventricular activation. The use of three-lead ECG data reduces the number of pace mappings required to localize the site of IVA origin in comparison to prior techniques. Such reduced pace mapping leads to shorter procedure time and therefore greater patient safety. Some embodiments accurately identify the site of earliest ventricular activation by projecting its estimated location onto patient-specific intracardiac electroanatomic geometry, which may be partial. That is, some embodiments utilize an incomplete electroanatomic map (EAM). Regarding accuracy, as described in detail herein, in a prospective, multicenter study of patients undergoing IVA catheter ablation, twenty-three IVA origin sites were localized by an embodiment, with a mean localization accuracy of 3.6 mm, an accuracy significantly better than any prior published system. These and other features and advantages are disclosed in detail herein.

FIG. 1 is a schematic diagram of an intraprocedural automated system 100 for localizing idiopathic ventricular arrhythmia origins according to various embodiments. As shown, system 100 may be used to automatically identify the location the site of origin of an idiopathic ventricular arrhythmia in patient 102.

System 100 includes pace mapping system 104, which is communicatively coupled to computer 108. Pace mapping system 104 includes an ablation catheter, which may include sensors for generating an EAM. Pace mapping system 104 further includes hardware and software for conducting pace mapping. Pace mapping data (which may include EAM data) obtained by pace mapping system 104 may be transferred to computer 108 for processing as shown and described.

System 100 further includes ECG system 106, which is communicatively coupled to computer 108. ECG system includes cabling, leads, and electrodes. Although three leads are schematically represented in FIG. 1, more leads may be present in ECG system 106. ECG system 106 further includes hardware and software for ECG signal acquisition and processing. ECG data acquired by ECG system 106 may be transferred to computer 108 for processing as shown and described.

Computer 108 of system 100 may process pace mapping data received from pace mapping system 104 and ECG data received from ECG system 106 to automatically localize idiopathic ventricular arrhythmia origins in patient 102 using the techniques disclosed herein. For example, computer 108 may implement method 200, as shown and described below in reference to FIG. 2, based on data received from pace mapping system 104 and ECG system 106. According to some embodiments, the operations of computer 108 and their associated hardware are included in one of pace mapping system 104 and ECG system 106.

An example implementation of system 100 is described in reference to a prospective study conducted by the present inventors, by way of non-limiting example. The description of system 100 in reference to the study is presented by way of example rather than limitation. System 100 is not limited to equipment and techniques of the study.

Patients undergoing catheter ablation of IVAs were recruited at two centers (Johns Hopkins Hospital and Queen Elizabeth II Health Sciences Centre) for the prospective study. All patients gave written informed consent to participate in the study.

In the study, ECG system 106 included the following. Eight independent leads (I, II, V1-V6) of the twelve-lead ECG were acquired via multichannel recording system (Prucka Cardiolab, GE Healthcare, Waukesha, WI) during the electrophysiology (EP) study, filtered (0.05 to 100 Hz), and sampled at 1000 Hz with 16-bit resolution; the other 4 leads (Lead III, aVF, aVL, aVR) were simultaneously computed. The output of the amplifier and system that routinely processes the signal was cloned to an ancillary secured computer (e.g., computer 108) where additional processing and analysis can be performed without affecting the clinical signal. Within each seven seconds recording during IVAs or pacing performed in sinus rhythm, an IVA or paced beat was manually selected for analysis. The system did not need a the acquisition of a complete electroanatomic geometry. The QRS integrals (JQRS) calculated over the initial 120 ms of the QRS complex of the three-lead ECG (III, V2, V6) were extracted by the system and used for offline analysis. The QRS onset was automatically identified. Manual adjustment of the 120-ms window was performed if correction of QRS onset was necessary. In addition, Cartesian coordinates of known pacing sites and corresponding paced ECGs, and the mapped IVA's intracardiac EAM geometry were exported (e.g., to computer 108) for offline analysis.

During a procedure, mapped IVAs' standard ECGs were recorded in real time. A partial 3D EAM geometry or a partial 3D EAM integrated with intracardiac echocardiography (CartoSound, Biosense Webster, Diamond Bar, CA) of the chamber of interest was created. The system used 120-ms QRS integrals from leads III, V2, V6, to compute personalized linear-regression coefficients relating three-lead 120-ms QRS integrals to the x, y, z coordinates of the pacing site. The study used all recorded pacing sites ("Distribution #1") of a mapped IVA in chronological order with known locations and used ten pacing sites ("Distribution #2") as close as possible to a mapped IVA with known locations to calculate patient-derived regression coefficients. The patient-derived regression coefficients were used with the three-lead 120-ms QRS integrals of the mapped IVA to predict the IVA site. If the predicted IVA site is within the EAM chamber geometry of interest, the predicted IVA site was then projected onto the patient-specific EAM geometry using the EAM triangle-mesh geometry site nearest the tip of the predicted site. A detailed description of these operations is shown and described in reference to the workflow of FIG. 2, below.

In the study, pace mapping system 104 included the following. The IVA ablation procedure was performed using standard techniques. Access to the left ventricle was achieved via a retrograde aortic or trans-septal approach, and to the right ventricle via a transvenous approach. For each procedure, Carto 3 (Biosense Webster, Diamond Bar, CA) or EnSite™ Precision (Abbott, St. Paul, MN) system was used for EAM; an EAM was created using an open-irrigated catheter (ThermoCool SmartTouch., Biosense Webster, Diamond Bar, CA; FlexAbility SE, Abbott, Abbott Park, Ill.) or a high-density (HD) multi-electrode catheter (PentaRay NAV Catheter, Biosense Webster; Grid Catheter, Abbott, Abbott Park, Ill.). The use of an image integration module (CartoSound, Biosense Webster, Diamond Bar, CA) was left to the discretion of the attending electrophysiologist. Activation mapping and pace mapping of the left ventricle and/or right ventricle were performed to localize the site of IVA origin sites. Pacing-site location and distribution was at the discretion of the operating electrophysiologist. Pacing was performed with stable catheter position at multiple sites at minimum pacing output (range: 2 milliamps (mA) to 10 mA) that ensured consistent focal myocardial capture, at which point the Carto 3/EnSite™ Precision mapping system was used to tag it and acquire the x, y, z coordinates. Radiofrequency (RF) ablation was performed using an open-irrigated catheter (ThermoCool SmartTouch., Biosense Webster, Diamond Bar, CA; FlexAbility SE, Abbott, Abbott Park, Ill.) when targeting the earliest activation site, pre-systolic potentials and 12/12 pace matches. Procedural success was defined as complete elimination of the clinical IVA. Partial success was defined as ≥50% reduction in PVC burden.

A description of a method consistent with that of the study follows immediately in reference to FIG. 2 below. Subsequently, an analysis and description of the results of the prospective study is presented.

Figure 2:
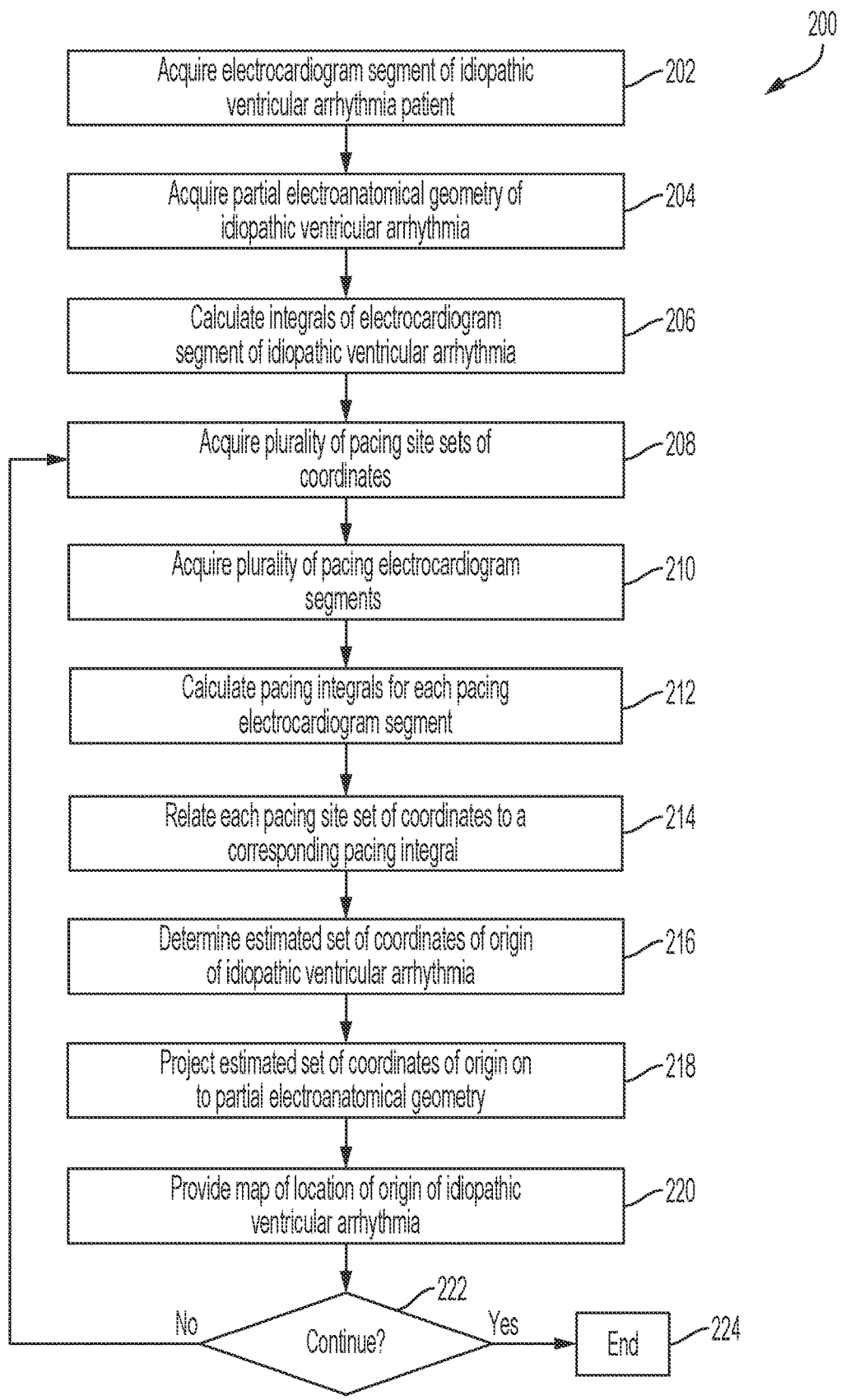
FIG. 2 is flowchart for an automated intraprocedural method of localizing idiopathic ventricular arrhythmia origins according to various embodiments.

FIG. 2 is flowchart for an automated intraprocedural method 200 of localizing idiopathic ventricular arrhythmia origins according to various embodiments. Method 200 may be implemented by system 100 as shown and described above in reference to FIG. 1. Method 200 is consistent with the prospective study described herein.

At 202, method acquires an ECG segment of the patient's IVA. The ECG segment should be sufficient from which to calculate a QRS integral. The segment may thus be of at least 120 ms in duration. Method 200 may utilize all twelve ECG leads, or a subset thereof (e.g., three leads, such as leads III, V2, V6; or leads III, V1, and V4; or Frank leads X, Y, Z) to acquire the ECG segment according to various embodiments.

At 204, method 200 acquires at least a partial electroanatomic geometry of the patient. The physician may decide which ventricular chamber to begin creating the electroanatomic geometry of based on the ECG of the IVA acquired at 202. That is, the ventricular chamber of interest may be selected by examining the ECG segment acquired at 202, and the electroanatomic geometry may be generated for the selected ventricular chamber of interest. The electroanatomic geometry may be in the form of a complete or partial EAM. The electroanatomic geometry may include geometric relations, without superimposing or otherwise including electrophysiological data. The electroanatomic geometry may be acquired by the ablation catheter used in the procedure during and throughout the procedure. Note that the electroanatomic geometry may thus be generated passively, in the sense that the physician may not position the catheter specifically to gather electroanatomic geometry data. Rather, the physician may conduct the electrophysiology procedure, including the ablation, without needing to gather data specifically for the geometry.

At 206, method 200 calculates 120-ms QRS integrals for the ECG segment of the IVA acquired per 202 for three leads (e.g., leads III, V2, and V6; alternately leads III, V1, and V4; alternately Frank leads X, Y, and Z) and for each dimension, x, y, z. Note that the actions of 206 may occur at any point subsequent to the actions of 202 and prior to the actions of 216. The actions of 206 may be performed by computer 108 once it receives the IVA ECG data obtained at 204.

At 208, method 200 acquires a plurality of pacing site sets of coordinates, and at 210, method 200 acquires corresponding pacing ECG segments. That is, per 208 and 210, the pacing sites' location coordinate set (X, Y, Z) and the corresponding pace-mapping ECG segments are acquired for analysis. The actions of 208 and 210 may thus pe performed simultaneously. The pacing coordinate sets may be selected by the physician conducing the procedure. At least five pacing sites and corresponding ECG segments may be acquired. Note that five pacing sites and associated ECG segments may be sufficient for various embodiments.

At 212, method 200 calculates 120-ms QRS integrals for the pacing ECG segments acquired at 210 for three leads (e.g., leads III, V2, and V6; or leads III, V1, and V4; or Frank leads X, Y, and Z) and for each of three dimensions, x, y, z. The actions of 212 may be performed by computer 108 after it receives the pacing ECG data at 210.

At 214, method relates each pacing site set of coordinates obtained at 208 to a corresponding pacing integral obtained at 212. To do so according to some embodiments, for 214, the QRS integrals of the paced activations are entered into multiple regression models (e.g., one for each dimension x, y, z) linking them to each of the pacing sites' known coordinate sets (X, Y, Z). Regression coefficients are then determined from these models for use at 216. In more detail, multiple linear regression models with intercept may be used to determine the regression coefficients in the regression equations linking each of the three coordinates of a known pacing site $X_j$, $Y_j$, $Z_j$ (j=1, ... m) with the values of the corresponding pace-mapped QRS integrals, $P_{ji}$, where the subscript i indicates one of the three leads (e.g., III, V2, and V6; other sets of three leads may be used in the alternative). Such regression equations may be as represented by way of non-limiting example as:

$$X_j = \alpha_0 + \Sigma_{i=1}^3 \alpha_i P_{ji}, Y_j = \beta_0 + \Sigma_{i=1}^3 \beta_i P_{ji}, X_j = \gamma_0 + \Sigma_{i=1}^3 \gamma_i P_{ji} \quad (1)$$

In Equations (1), $\alpha_i$, $\beta_i$, and $\gamma_i$ are the regression coefficients; they are patient-specific and are calculated during each procedure at 214 by method 200. Thus, fitting the multiple linear regression model with intercept to the known pacing site data and the QRS integral data generates coefficients $\alpha_i$, $\beta_i$, and $\gamma_i$ for i=1, 2, 3.

At 216, method 200 determines an estimated set of coordinates $(\hat{X}, \hat{Y}, \hat{Z})$ for the site of origin of the idiopathic ventricular arrhythmia. To do so, method 200 uses the regression coefficients obtained at 214 and the three-lead 120-ms QRS ECG integral of the IVA as calculated at 206. More particularly, method 200 uses regression coefficients $\alpha_i$, $\beta_i$, and $\gamma_i$ for i=1, 2, 3 in the multiple linear regression models developed at 214 linking each of the coordinates of the IVA origin site $\hat{X}, \hat{Y}, \hat{Z}$ to the values of the 120-ms IVA QRS integrals calculated at 206. These relationships may be represented as, by way of non-limiting example:

$$\hat{X} = \alpha_0 + \Sigma_{i=1}^{3}\alpha_i V_i, \hat{Y} = \beta_0 + \Sigma_{i=1}^{3}\beta_i V_i, \hat{Z} = \gamma_0 + \Sigma_{i=1}^{3}\gamma_i V_i \quad (2)$$

The unknowns in Equations (2) are the estimated coordinates of the IVA origin site, $\hat{X}, \hat{Y}$, and $\hat{Z}$.

At 218, method projects the estimated set of coordinates of origin of the IVA, denoted as $(\hat{X}, \hat{Y}, \hat{Z})$, on to the partial electroanatomical geometry acquired at 204. The predicted IVA origin site set of coordinates $(\hat{X}, \hat{Y}, \hat{Z})$ may be projected on to an acquired partial EAM represented as a triangular mesh using a nearest neighbor algorithm, for example. The mesh node nearest to the tip of the predicted location may define the projected location.

At 220, method 200 provides a map of the location of the origin of the IVA. The map may be the partial EAM acquired at 204 with the projected set of coordinates $(\hat{X}, \hat{Y}, \hat{Z})$ of 218 displayed thereon. The map may be provided in a variety of ways via a variety of communication channels. According to some embodiments, the map is provided by displaying it on a computer monitor visible to the physician, e.g., a monitor of computer 108. Alternately, or in addition, the map may be displayed in a heads-up display, smart phone, or tablet, or it may be provided electronically over a computer network, such as in an email of via a file transfer protocol. According to some embodiments, the map is provided by being stored in a laboratory information system.

At 222, a decision is made as to whether to continue method 200. As the prediction may not always be accurate, the predicted site can be used as a pacing site for another iteration, quickly and accurately converging on the origin of the IVA. Thus, in general, method 200 may be iterated to home in on the IVA origin site. Each iteration after the first iteration may include the estimated site of origin at $(\hat{X}, \hat{Y}, \hat{Z})$ from the previous iteration as a pacing site used at 208 and 210 to acquire pacing site sets of coordinates and pacing ECG segments, respectively. That is, the physician may include $(\hat{X}, \hat{Y}, \hat{Z})$ from a prior iteration, e.g., as projected on to an electroanatomic geometry, as a pacing site in the next iteration. In doing so, each iteration gets closer to the actual site of origin of the IVA.

Several factors, alone or in combination, may influence whether method 200 continues at 222. According to some embodiments, method 200 is iterated a fixed number of times, e.g., five, six, seven, eight, nine, or ten times. According to some embodiments, method 200 is iterated until two (or three, or four, or five) successive origin site estimates are within a threshold distance from each-other. Such a threshold may be, e.g., 2 mm, 3 mm, 4 mm, 5 mm, 6 mm, 7 mm, 8 mm, 9 mm, or 10 mm. According to some embodiments, a combination of factors may be used, e.g., method 200 may be iterated until successive origin site estimates converge or a fixed number of iterations are completed, whichever occurs first.

If, at 222, method 200 is to continue, then control reverts to 208, and the current IVA site of origin estimate is used as a pacing site in the next iteration. If, at 222, method 200 is to end, the control passes to 224, and method 200 ends.

The description of prospective study and an analysis of the results thereof continues below in reference to FIGS. 3-7.

In the study, all IVA ablation procedures were performed by clinicians, blinded to the prediction results of the system. The IVA origin site was clinically identified by activation mapping and/or pace-mapping. Origin sites on the EAM were defined in stepwise priority as: (1) sites of successful IVA suppression with ablation, and/or (2) sites of earliest activation, and/or (3) pace-mapping sites that had the highest correlation score when activation mapping was not performed due to a low PVC burden. Localization of a mapped IVA was performed on an ancillary secured computer with the system. Estimated localization accuracy was quantified for the IVA origin site in millimeters, by comparing the estimated against the clinically-defined locations.

The mean and standard deviation were used to report statistical analysis results. Two pacing-site distributions were compared by using paired t-test. A comparison of the localization error between right ventricle and left ventricle IVAs was conducted using two-sample t-test. A double-sided $P<0.05$ was considered statistically significant. Statistical analysis was performed with the Minitab 18 Statistical Software (Minitab Inc, State College, PA).

A total of twenty-two sequential consenting patients were recruited from two centers (Johns Hopkins Hospital n=13; and Queen Elizabeth II Health Sciences Centre n=9) for the prospective study. Two patients were excluded from final analysis due to absence of PVCs at the time of the procedure. Twenty patients (70.0% male, 59.5±19.6 years) were studied. The patients' clinical characteristics are summarized in Table 1.

TABLE 1

Clinical characteristics of Twenty IVA patients

| Clinical Characteristics | Number (%) |
|---|---|
| Male | 14 (70.0) |
| Age (years) | 59.5 ± 19.6 years |
| Type of arrhythmia | |
| PVC | 9 (45.00) |
| VT | 4 (20.00) |
| PVC/VT | 7 (35.00) |
| ICM | 4 (20.00) |
| Heart failure | 3 (15.79) |
| ICD present | 2 (10.53) |
| CRTD present | 1 (5.26) |

Table 1 Key: IVA=idiopathic ventricular arrhythmia; Age (years) represented as Mean±Standard Deviation; PVC=premature ventricular contraction; VT=ventricular tachycardia; ICM=Ischemic cardiomyopathy; ICD=implantable cardioverter-defibrillator; CRTD=cardiac resynchronization therapy defibrillator For the twenty patients, twenty-three IVA (twenty-one PVC and two VTs) were mapped to both ventricular chambers and neighboring vessels, as shown in Table 2, and recorded by the system in real time.

TABLE 2

Clinical Mapped IVA Origin Sites

| Patient # | Mapped PVC/VT | Clinically Identified Origin Site | Ablation Localization | AM | PM | Ablation SA Successful? |
|---|---|---|---|---|---|---|
| 1 | PVC | Posteroseptal RVOT | Posteroseptal RVOT and the left and right coronary cusp commissure | ✓ | | Partial |
| 2 | PVC | Basal anterolateral wall of the left ventricle, adjacent to the mitral valve | Basal anterolateral wall of the left ventricle, adjacent to the mitral valve | ✓ | | Partial |
| 3 | PVC | Posteromedial papillary muscle | Posteromedial papillary muscle | ✓ | | YES |
| 4 | PVC | Posteromedial papillary muscle | Posteromedial papillary muscle | | ✓ | YES |
| 5 | VT | RV moderator band | N/A | | ✓ | NA |
| 6 | PVC | Posteromedial papillary muscle | Posteromedial papillary muscle | ✓ | | YES |
| 7 | PVC1 | RV moderator band | RV moderator band | ✓ | | YES |
|   | PVC2 | Septal side of the moderator band and apical septal insertion side | Septal side of the moderator band and apical septal insertion side | ✓ | | YES |
| 8 | PVC1 | Posteromedial papillary muscle | Posteromedial papillary muscle | ✓ | | YES |
|   | PVC2 | Slightly more lateral to posteromedial papillary muscle | Posteromedial papmuscleillary | ✓ | | YES |
|   | PVC3 | Right coronary cusp in LVOT | Right coronary cusp in LVOT | ✓ | | YES |
| 9 | PVC | Posteromedial papillary muscle | Posteromedial papillary muscle | ✓ | | YES |
| 10 | PVC | Distal CS | Within the distal CS and LV endocardium directly opposite the earliest site in the CS | ✓ | | YES |
| 11 | PVC | AMC | AMC | ✓ | | YES |
| 12 | PVC | Septal RVOT | Septal RVOT | ✓ | | YES |
| 13 | PVC | Lateral RVOT | Lateral RVOT | ✓ | | YES |
| 14 | VT | AMC | AMC | | ✓ | YES |
| 15 | PVC | RVOT free wall | RVOT free wall | ✓ | | YES |
| 16 | PVC | Septal tricuspid valve papillary muscle | Right ventricular septum | ✓ | | YES |
| 17 | PVC | Right coronary cusp in LVOT | Right coronary cusp in LVOT | ✓ | | YES |
| 18 | PVC | Posteromedial papillary muscle | Posteromedial papillary muscle | ✓ | | YES |
| 19 | PVC | LV crux | LV crux | ✓ | | YES |
| 20 | PVC | Anterior surface of the posteromedial papillary muscle | Anterior surface of the posteromedial papillary muscle | | ✓ | YES |

Table 2 Key IVA=idiopathic ventricular arrhythmia; PVC=premature ventricular complex; IVT=idiopathic ventricular tachycardia; EAM=electroanatomic mapping; AM=activation mapping; PM=pace-mapping; SA=suppression with ablation; RVOT=right ventricular outflow tract; LVOT=left ventricular outflow tract, RV=right ventricular; CS=coronary sinus; AMC=aorto-mitral continuity; LV=left ventricular. The PVC/IVT origin site was clinically identified by AM/PM/SB is given by ✓. NA defined no ablation performed in this case due to given clinical significance of PVC was not known, and patient inability to tolerate the procedure.

In summary, eight IVA localized to the right ventricle, fourteen were from the left ventricle (including eight from the posteromedial papillary muscle, and two from the aortic root) and one was from the distal coronary sinus; IVA origin sites were clinically identified primarily with activation mapping in nineteen IVA (82.61%), pace-mapping in three IVA (13.04%) and successful suppression with ablation in one IVA (4.35%) (see Table 2).

Seventeen patients underwent an electrophysiology study with the Carto 3 (Biosense Webster, Diamond Bar, CA) mapping system, and three patients with the EnSite™ Precision (Abbott, St. Paul, MN) system. Acute procedural success was achieved in 19/21 PVCs. Partial acute PVC ablation success was achieved in 2/21 PVCs. One IVT was primarily pace-mapped to the right ventricle moderator band, however ablation was not performed because this was not the patient's clinical VT and due to the difficulty in inducing the VT; the other was successfully ablated at the region of the aorto-mitral continuity (AMC).

Figure 3:
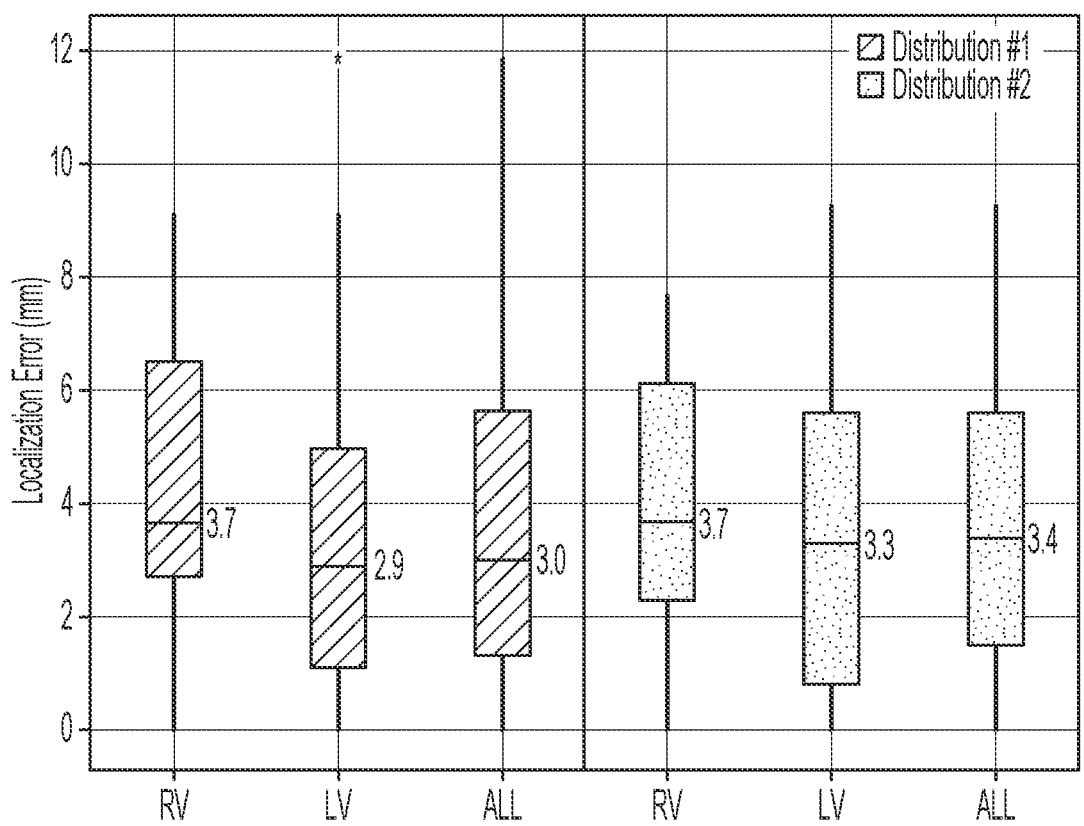
FIG. 3 depicts localization errors according to pacing site distribution and cardiac chamber type from a prospective study.

FIG. 3 depicts localization errors according to pacing site distribution and cardiac chamber type from the prospective study. Boxes represent interquartile range, error-bars represent range, "*" indicates outliers, and the lines within the boxes indicates medians. The "ALL" plot represents the aggregate of all IVAs across all chambers, "RV" indicates right ventricle, and "LV" indicates left ventricle. Patients in the study had 1.2±0.0 IVAs and 15.2±9.1 pacing sites. The spatial resolution (i.e., the average edge length) of all twenty patient-specific anatomic geometries was 1.8±0.5 mm. The twenty-three IVA morphologies were successfully localized onto the patient-specific EAM geometry using the system; localization errors of all twenty-three IVA source sites are summarized in FIG. 3. Mean localization accuracy was 3.6±3.0 mm when using all recorded pacing sites of the mapped IVA in chronological order (Distribution #1). When including up to ten nearest pacing sites of a clinically-identified IVA (Distribution #2), the mean accuracy was 3.6±2.6 mm, as shown below in Table 3. There was no statistical difference in localization error between Distribution #1 and Distribution #2 (P>0.05). There was no difference in mean localization error in right ventricle compared to left ventricle using Distribution #1 (4.3 vs. 3.3 mm, P>0.05, respectively) or Distribution #2 (3.9 vs. 3.4 mm, respectively).

TABLE 3

Study Localization Accuracy

| Patient # | Mapped PVC/VT | # of sites pacing | Anatomic geometry | 10 nearest Pacing Sites | Distribution #1 Localization Error (mm) | Distribution #2 Localization Error (mm) |
|---|---|---|---|---|---|---|
| 1 | PVC | 14 | EAM | 10 | 9.1 | 7.7 |
| 2 | PVC | 10 | EAM | 10 | 3.3 | 3.3 |
| 3 | PVC | 17 | EAM* | 10 | 2.7 | 4.6 |
| 4 | PVC | 16 | EAM | 10 | 0.0 | 0.0 |
| 5 | VT | 18 | EAM | 10 | 2.7 | 2.2 |
| 6 | PVC | 8 | EAM | 8† | 5.0 | 5.0 |
| 7 | PVC1 | 9 | EAM | 9† | 0.0 | 0.0 |
|  | PVC2 | (9 + 3)** | EAM | 10 | 6.6 | 6.6 |
| 8 | PVC1 | 20 | EAM | 10 | 0.0 | 0.0 |
|  | PVC2 | 11 | EAM* | 10 | 1.1 | 0.0 |
|  | PVC3 | 19 | EAM | 10 | 3.9 | 3.9 |
| 9 | PVC | 16 | EAM | 10 | 2.9 | 3.0 |
| 10 | PVC | 9 | EAM | 9† | 1.5 | 1.5 |
| 11 | PVC | 7 | EAM | 7† | 5.6 | 5.6 |
| 12 | PVC | 14 | EAM | 10 | 4.0 | 2.5 |
| 13 | PVC | 11 | EAM | 10 | 6.2 | 4.6 |
| 14 | VT | 16 | EAM | 10 | 3.0 | 2.6 |
| 15 | PVC | 14 | EAM | 10 | 2.7 | 4.0 |
| 16 | PVC | 19 | EAM | 10 | 3.3 | 3.4 |
| 17 | PVC | 12 | EAM | 10 | 11.9 | 9.3 |
| 18 | PVC | 22 | EAM* | 10 | 1.3 | 5.9 |
| 19 | PVC | 8 | EAM | 8† | 5.7 | 5.7 |
| 20 | PVC | 10 | EAM | 10 | 0.8 | 0.8 |

Table 3 Key: IVA=idiopathic ventricular arrhythmia; PVC=premature ventricular complex; VT=ventricular tachycardia. Distribution #1 was to use all recorded pacing sites to localize the site of a mapped PVC/VT origin. Distribution #2 was to use the ten nearest pacing sites of an identified PVC/VT origin site to compute the identified PVC/VT origin site. EAM=electroanatomic; '*' integrated geometry of intracardiac echocardiography imaging and the EA map. '†' fewer than ten pacing sites were available. '**' defines a set of pacing sites that consists of previous 9 pacing sites from mapping PVC1 and the recorded 3 additional pacing sites from mapping PVC2.

Anonymized details of four exemplar patients from the study, Patient #6, Patient #10, Patient #12, and Patient #17, are shown and described below in reference to FIGS. 4-7 to illustrate the ability of embodiments to localize IVA origin sites from different anatomical locations.

Figure 4:
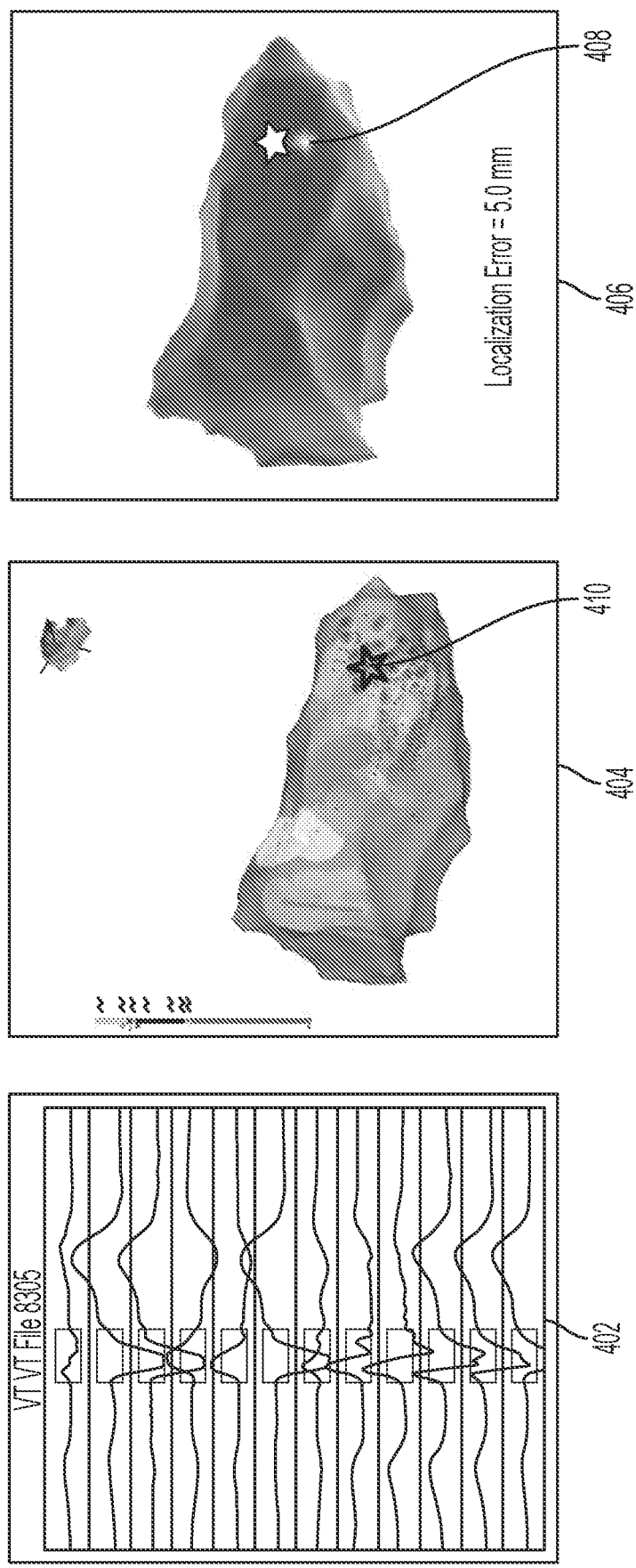
FIG. 4 illustrates, for Patient #6 of a prospective study, having a premature ventricular complex of papillary muscle origin, an electrocardiogram segment, an electroanatomic map depicting an activation-mapping-predicted origin site, and an electroanatomic map depicting an embodiment-predicted origin site.

FIG. 4 illustrates, for Patient #6, having a PVC of papillary muscle origin, an ECG segment 402, an EAM 404 depicting an activation-mapping-predicted origin site 410, and an EAM 406 depicting an embodiment-predicted origin site 408. ECG segment 402 shows the recorded twelve-lead ECG of PVC during the procedure for Patient #6 in the study. The onset of one PVC beat was automatically detected; the user can edit the onset of the 120-ms window (rectangle box) if correction is necessary. The clinical PVC had a right-bundle-branch-block-type (RBBB) morphology, inferior axis, and was biphasic in lead I.

EAM 404 is an endocardial local-activation-time (LAT) EAM for Patient #6, with the site of PVC origin site, as identified by activation mapping, depicted by the star at 410. Endocardial EAM 404 is of the left ventricle and was performed using the EnSite mapping system. Pace mapping and activation mapping were performed, with the earliest activation site 410 found on the posteromedial papillary muscle and indicated by the star on EAM 404. Radiofrequency ablation lesions were applied over this area, with elimination of the PVC burden.

EAM 406 depicts the PVC origin site 408 as determined by an embodiment, with the actual site of PVC origin marked by the star. EAM 406 shows that the system predicted accurately the site 408 of the PVC origin on the posterolateral papillary muscle, achieving a localization accuracy of 5.0 mm when using eight pacing sites.

Figure 5:
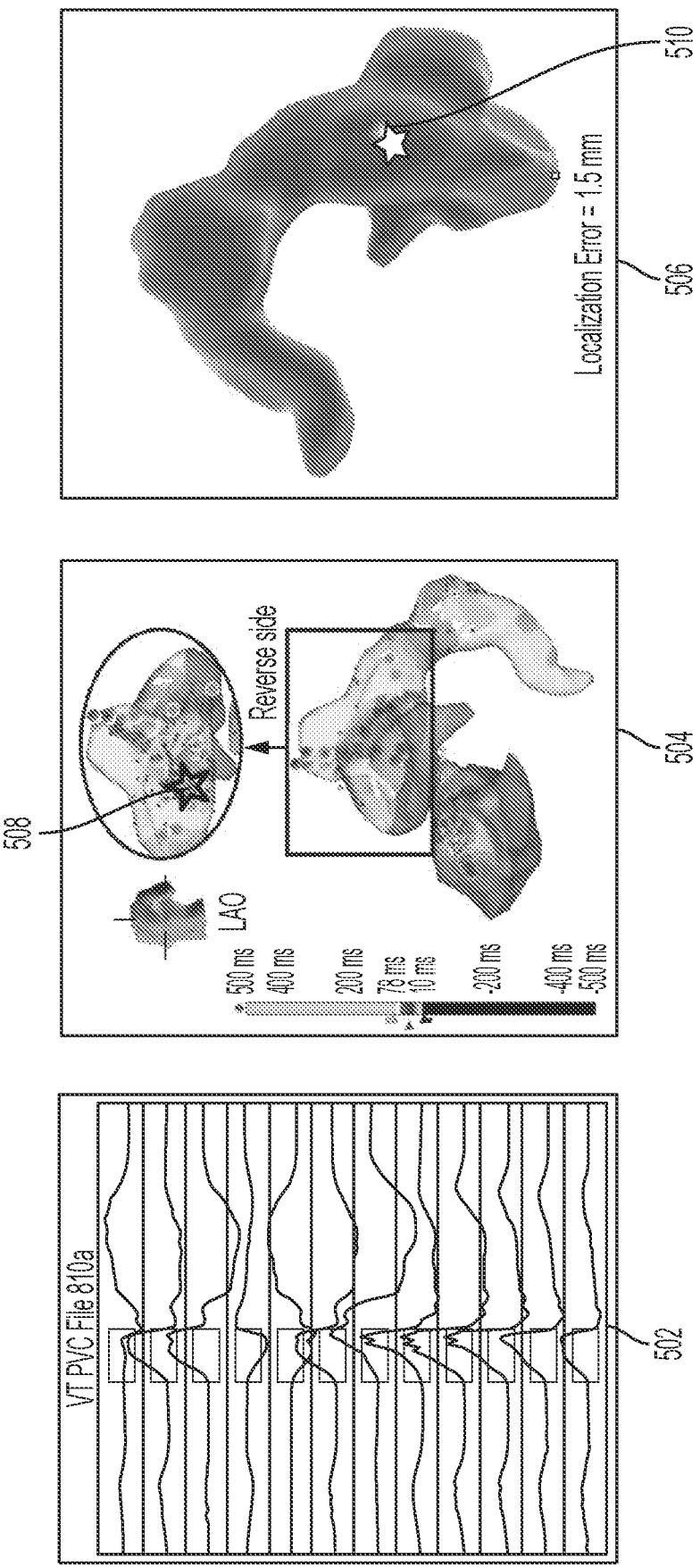
FIG. 5 depicts, for Patient #10, having a premature ventricular complex of distal coronary sinus origin, an electrocardiogram segment, an electroanatomic map depicting an activation-mapping-predicted origin site, and an electroanatomic map depicting an embodiment-predicted origin site.

FIG. 5 depicts, for Patient #10, having a PVC of distal coronary sinus origin, an ECG segment 502, an EAM 504 depicting an activation-mapping-predicted origin site 508, and an EAM 506 depicting an embodiment-predicted origin site 510. ECG segment 502 shows the recorded twelve-lead ECG of the PVC during the procedure for Patient #10. The onset of one PVC beat was automatically detected; the user can edit the onset of the 120-ms window (rectangle box) if correction is necessary. As depicted by ECG 502, the clinical PVC of the patient had a RBBB morphology with an inferior axis and positive concordance in all precordial leads.

EAM 504 is a patient-specific coronary sinus EAM with left anterior descending (LAO) view, with the PVC origin site 508, identified by activation mapping, depicted by the star. Activation mapping was first performed in the coronary sinus with earliest activation in the distal coronary sinus. RF ablation lesions were applied over this region with transient suppression of the PVCs. RF ablation lesions at this site were limited due to high impedance. Mapping was then performed of the left ventricle endocardium, directly opposite the earliest site in the coronary sinus. RF ablation up to 45 W was delivered at the site of earliest activation, resulting in PVC increased automaticity followed by PVC suppression. The PVC origin site 508 was identified in the distal coronary sinus, indicated by the star.

EAM 506 depicts the results of using an embodiment to predict a PVC origin site 510 on the EA geometry, with the actual site of PVC origin marked by the star. Localization error of PVC origin site is 1.5 mm. In EAM 506, small squares indicate recorded pacing sites. The study used all recorded nine pacing sites within the coronary sinus EAM geometry to predict the site of PVC origin onto the distal coronary sinus.

Figure 6:
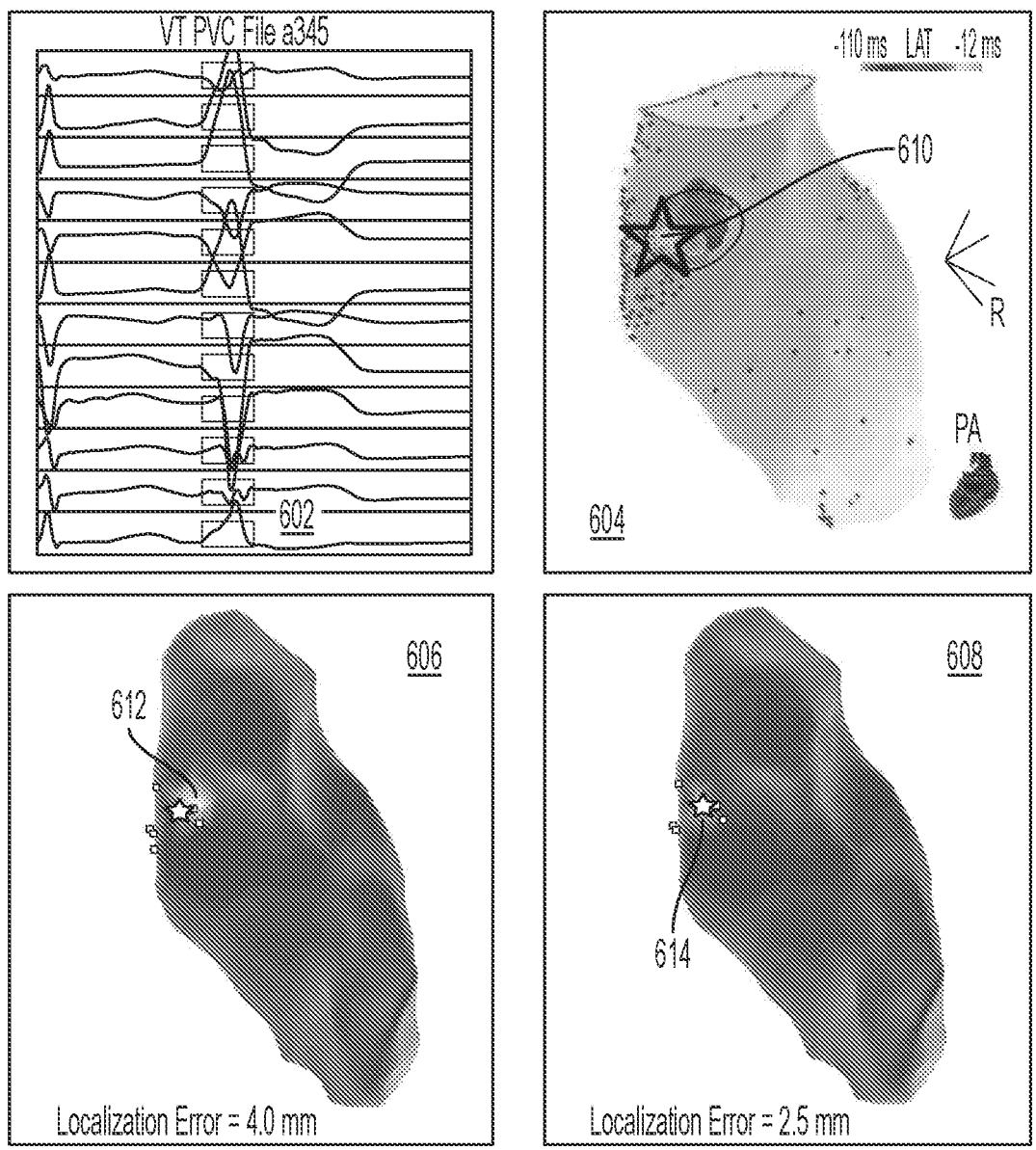
FIG. 6 depicts, for Patient #12, having a right ventricular outflow tract PVC, an electrocardiogram segment, an electroanatomic map depicting an activation-mapping-predicted origin site, an electroanatomic map depicting an embodiment-predicted origin site based on a first pacing site distribution, and an electroanatomic map depicting an embodiment-predicted origin site based on a second pacing site distribution.

FIG. 6 depicts, for Patient #12, having a right ventricular outflow tract PVC, an ECG segment 602, an EAM 604 depicting an activation-mapping-predicted origin site 610, an EAM 606 depicting an embodiment-predicted origin site 612 based on a first pacing site distribution, and an EAM 608 depicting an embodiment-predicted origin site 614 based on a second pacing site distribution. ECG segment 602 shows the recorded twelve-lead ECG of a PVC during the procedure for Patient #12. The onset of one PVC beat was automatically detected; the user can edit the onset of the 120-ms window (rectangle box) if correction is necessary. The clinical PVC had a left-bundle-branch-block-type morphology with a rightward axis, and a transition in the precordial lead at V6.

EAM 604 depicts the endocardial EAM local-activation-time map of right ventricular outflow tract for this patient, with the site 610 of PVC origin, identified by activation mapping, depicted by the star. EAM 604 was created using the Carto 3 mapping system. Activation and pace mapping of the PVC was performed. Activation mapping of the PVC revealed a local pre-QRS activation (−30 ms) with QS pattern on the local unipolar electrode in the septal right ventricular outflow tract at the site 610 indicated by the star; and pace-mapping at that location was 97% when using the PaSo™ module (Biosense webster, Diamond Bar, CA) to estimate the correlation coefficients between the PVC morphology and right ventricle pacing-site ECG morphologies. Despite the early activation, there was a large "blush" on the EAM and thus further activation mapping was performed in the left ventricular outflow tract opposite the earliest site on the right ventricular outflow tract. The activation time was later in the left ventricular outflow tract. RF ablation lesions were performed at the earliest activation site in the septal right ventricular outflow tract and the PVC burden was eliminated.

An embodiment was used to obtain the estimated origin sites in EAMs 606 and 608. Using each of the two pacing-site distributions, the PVC was localized in the septal right ventricular outflow tract region. EAM 606 represents the results of using an embodiment to predict the PVC origin site 612 on the right ventricular outflow tract EAM geometry when using all recorded pacing sites of the PVC (Distribution #1). Site 612 has a localization error of 4.0 mm in comparison with the actual PVC origin site indicated by the star. Small squares indicate recorded pacing sites on EAM 606. EAM 608 represents the results of using an embodiment to predict a PVC origin site 614 on the right ventricular outflow tract EAM geometry after including up to the ten nearest pacing sites of the actual PVC origin site marked by the star (Distribution #2), achieving a localization accuracy of 2.5 mm. Small squares indicate recorded pacing sites on EAM 608.

Figure 7:
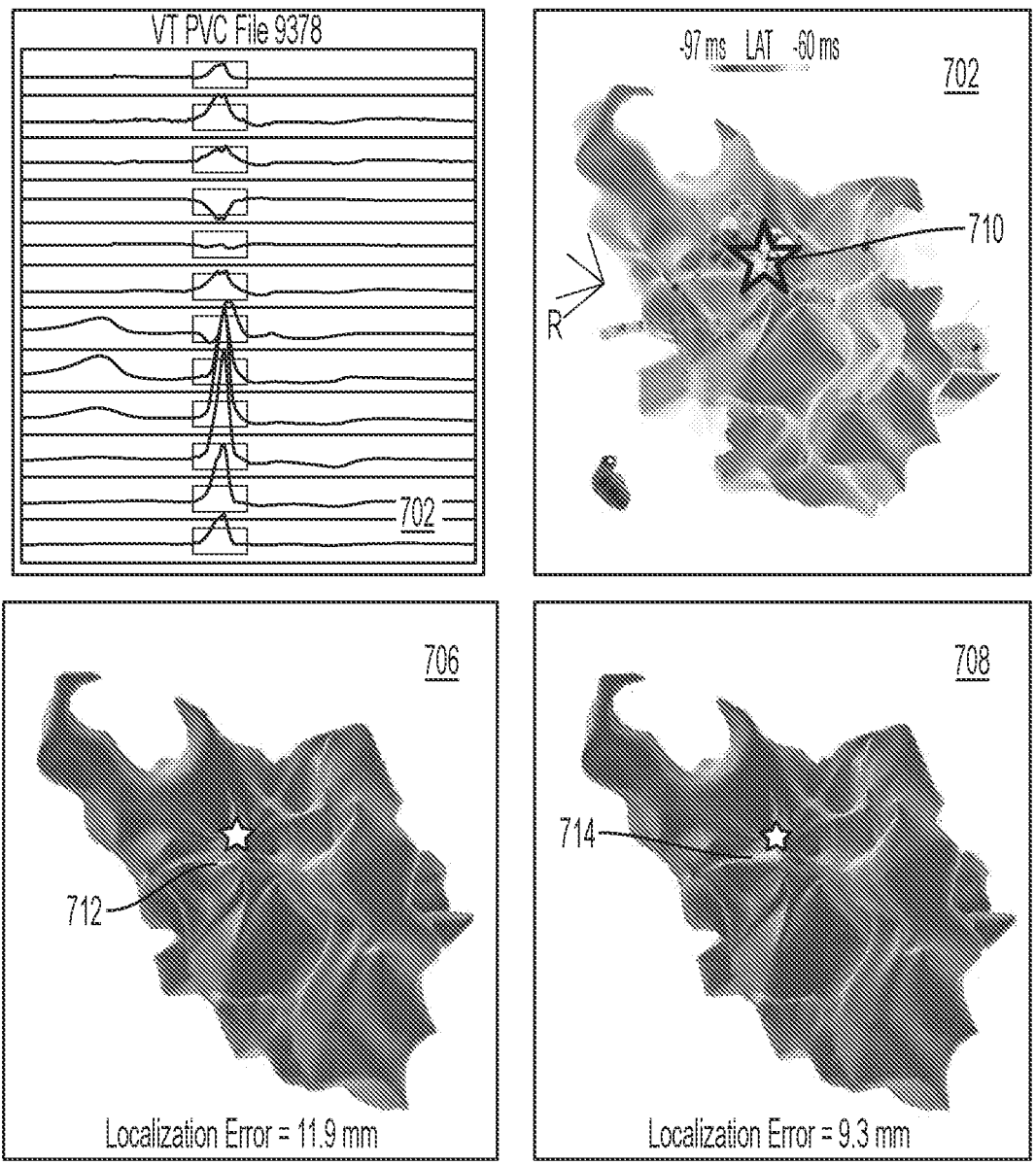
FIG. 7 depicts, for Patient #17, having a right coronary cusp premature ventricular complex, an electrocardiogram segment, an electroanatomic map depicting an activation-mapping-predicted origin site, an electroanatomic map depicting an embodiment-predicted origin site based on a first pacing site distribution, and an electroanatomic map depicting an embodiment-predicted origin site based on a second pacing site distribution.

FIG. 7 depicts, for Patient #17, having a right coronary cusp PVC, an ECG segment 702, an EAM 704 depicting an activation-mapping-predicted origin site 710, an EAM 706 depicting an embodiment-predicted origin site 712 based on a first pacing site distribution, and an EAM 708 depicting an embodiment-predicted origin site 714 based on a second pacing site distribution. ECG segment 702 shows the recorded twelve-lead ECG of mapped PVC morphology during the procedure for Patient #17. The onset of one PVC beat was automatically detected; the user can edit the onset of the 120-ms window (rectangle box) if correction is necessary. The clinical PVC had a left-bundle-branch-block-type morphology, inferior axis and positive concordance in all precordial leads.

EAM 704 illustrates the endocardial EAM local-activation-time map of right sinus of Valsalva for this patient, the site 710 of PVC origin (identified by activation mapping) depicted by the star. In particular, the clinical PVC origin site 710 was identified at the right sinus of Valsalva, where early activation was found 39 ms ahead of the PVC QRS onset indicated by a dot on EAM 704. Ablation in the right sinus of Valsalva resulted in complete suppression of the clinical PVC.

Embodiments were used to obtain the estimated origin sites in EAMs 706 and 708. EAM 706 shows the results of using an embodiment to predict a PVC origin site 712 on the right sinus of Valsalva when using all recorded pacing sites of the PVC (Distribution #1), having a localization error of 11.9 mm in comparison with the actual PVC origin site indicated by the star. Small squares indicate recorded pacing sites on EAM 706. EAM 708 shows the results of using an embodiment to predict a PVC origin site 714 on the right sinus of Valsalva after including up to ten nearest pacing sites of the actual PVC origin site marked by the star (Distribution #2), having a localization error of 9.3 mm. Small squares indicate recorded pacing sites on EAM 708. In sum, using each of the two pacing-site distributions, the estimated clinical PVC origin site was accurately localized onto the right sinus of Valsalva of the left ventricle, achieving a localization accuracy of 11.9 mm for EAM 706 and 9.3 mm for EAM 708, respectively.

The study has demonstrated that: (1) it is feasible to localize IVA origin sites on intracardiac EAMs of both ventricular chambers and neighboring vessels using an embodiment, (2) the embodiment achieved a mean localization accuracy of 3.6 mm, (3) the embodiment accurately predicted IVA origin sites in the right ventricle, aortic root and papillary muscles, and (4) a predicted IVA origin site can be displayed on a patient-specific intracardiac EAM geometry for a potential ablation target guidance. The localization accuracy of the embodiment was tested on two commercial mapping system (Carto 3 and EnSite™ Precision mapping systems). Finally, the study demonstrated the utility of the embodiment in a cohort of patients from two different clinical centers. An embodiment integrated into an EAM system would achieve data collection and localization analysis in real time, and the expectation is that accurate localization of the IVA origin site using the embodiment would significantly shorten the procedure time.

The study used two sets of pacing sites. Distribution #1 was a set of pacing sites at the discretion of the operator, as they would be placed during the procedure. Distribution #2 consisted of ten pacing sites from Distribution #1 that were closest to IVA origin. The embodiment's predictions for these two pacing site distributions were compared, and there was no statistical difference between the predicted IVA locations. This demonstrates that embodiments do not require a good estimate of the neighborhood of the site of origin, as they are less dependent on operator choices. According to some embodiments, an algorithm-based PaS™ module (Biosense Webster, Inc., Irvine, CA) provides quantitative matching of ECG morphologies. Although the PaSo™ module is efficiently used in a clinical electrophysiology study, it does not derive localization information. The embodiment of the study utilized the same pacing data obtained by the PaSo™ module during the ablation procedure to localize the site of origin of IVAs, highlighting the clinical utility of the embodiment.

The localization error range obtained in the study is narrow (3.6 mm) for diverse PVC/VT locations, illustrating the capability of the embodiment. No other ECG method is available to locate IVA origin sites within 3.6 mm localization accuracy. The advantages of embodiments include their ability to achieve precise localization on the clinical intracardiac patient-specific EAM using three-lead ECGs (III, V2 and V6) and several known pacing sites.

By comparison, a study using a commercially available 120-lead ECG imaging (ECGI) system recorded body surface potentials from 252 electrodes to identify noninvasively the site of focal activation and showed a median localization error of 20.7 mm in nine pigs. See Hohmann S, Rettmann M E, Konishi H, et al., *Spatial Accuracy of a Clinically Established Noninvasive Electrocardiographic Imaging System for the Detection of Focal Activation in an Intact Porcine Model*, Circ Arrhythm Electrophysiol. 2019; 12(11):e007570.

Compared to the ECGI system, embodiments can take advantage of invasive mapping from known intracardiac sites to generate predicted locations of ventricular arrhythmias. Embodiments do not require pre-procedure imaging, and do not rely on the assumptions required for inverse solution calculation (e.g., volume conductor, source model representation). For patients with multiple clinical PVCs, the collected sites of pace mapping can be repeatedly utilized to predict different IVA origin sites, which would decrease pace-mapping time and expense.

Although activation sequence mapping is more accurate as compared to pace mapping, it requires relatively frequent spontaneous clinical ectopy. The pace-mapping method is the only available method to identify the site of IVA origin when activation mapping cannot be performed due to low PVC burden. However, pace-mapping is less helpful in identifying papillary muscle IVA origin sites because a papillary muscle IVA origin site may be far away from a site with the best pace map. Furthermore, previous studies have demonstrated that the pace mapping method may be inaccurate when the excellent pacing-match site is more than 2 cm away from the site of PVC origin. However, the embodiment of the study provided accurate localization in this case and in all of the eight posteromedial papillary muscle PVCs and improved the ability of the pace-mapping method to utilize comprehensive multiple pacing sites information to accurately localize PVC origin sites. Therefore, embodiments offer an important improvement for the pace-mapping method to localize the IVA origins.

The study also established that embodiments may be capable of predicting a site that is located outside the endocardial geometry. Embodiments may relax the assumption that pacing is performed in the same chamber, including epicardial and vascular structures, as the arrhythmia. For Patient #10 where the PVC was arising from the distal CS, if the operating electrophysiologists only performed mapping endocardially, the embodiment could predict a site that is located outside the complete endocardial geometry, which then signifies the PVC origin site is on the epicardium. Note that embodiments have the capability to distinguish right ventricle and left ventricle or endocardium and epicardium for predicting IVA origin sites.

In sum, embodiments provide highly accurate localization of the site of PVC/IVT origin in both ventricular chambers and neighboring vessels, which can facilitate ablation procedures for patients with idiopathic ventricular arrhythmias.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. An intraprocedural method of identifying a location of an origin of an idiopathic ventricular arrhythmia in a patient, the method comprising:
    acquiring an at least partial electroanatomical geometry of the patient;
    acquiring an electrocardiogram segment of the idiopathic ventricular arrhythmia of the patient;
    calculating at least one integral of the electrocardiogram segment of the idiopathic ventricular arrhythmia;
    acquiring a plurality of pacing site sets of coordinates obtained by an intracardiac instrument for the patient;
    acquiring a plurality of pacing electrocardiogram segments of the patient, each pacing site set of coordinates of the plurality of pacing site sets of coordinates corresponding to at least one pacing electrocardiogram segment of the plurality of pacing electrocardiogram segments;
    calculating at least one pacing integral for each of the pacing electrocardiogram segments of the plurality of pacing electrocardiogram segments, whereby each pacing site set of coordinates of the plurality of pacing site of sets coordinates corresponds to at least one pacing integral;
    relating each pacing site set of coordinates of the plurality of pacing site sets of coordinates to at least one corresponding pacing integral, whereby a plurality of patient-specific regression coefficients are obtained, wherein the patient-specific regression coefficients link pacing site location coordinates to electrocardiogram integrals;
    determining an estimated set of coordinates of the origin of the idiopathic ventricular arrhythmia based on at least one integral of the electrocardiogram segment of the idiopathic ventricular arrhythmia of the patient and on the plurality of patient-specific regression coefficients; and
    projecting the estimated set of coordinates of the origin of the idiopathic ventricular arrhythmia on to the at least partial electroanatomical geometry of the patient, whereby a map of a location of the origin of the idiopathic ventricular arrhythmia is obtained.

2. The method of claim 1, wherein the acquiring the plurality of pacing electrocardiogram segments of the patient comprises acquiring the plurality of pacing electrocardiogram segments obtained using only three electrocardiogram leads.

3. The method of claim 2, wherein the only three electrocardiogram leads consist of one of: a III lead, a V2 lead, and a V6 lead; or a III lead, a V1 lead, and V4 lead; or Frank leads X, Y, Z.

4. The method of claim 2, wherein the acquiring the plurality of sets of pacing site sets of coordinates comprises acquiring no more than five pacing site sets of coordinates.

5. The method of claim 1, further comprising ablating the origin of the idiopathic ventricular arrhythmia based on at least the map of the origin of the idiopathic ventricular arrhythmia.

6. The method of claim 1, further comprising:
    acquiring a second plurality of pacing site sets of coordinates for the patient, the second plurality of pacing site sets of coordinates comprising a set of coordinates corresponding to the estimated set of coordinates of the origin of the idiopathic ventricular arrhythmia;
    acquiring a second plurality of pacing electrocardiogram segments for the patient, each pacing site set of coordinates of the second plurality of pacing site sets of coordinates corresponding to at least one pacing electrocardiogram segment of the second plurality of pacing electrocardiogram segments;
    calculating a second pacing integral for each of the pacing electrocardiogram segments of the second plurality of pacing electrocardiogram segments, whereby each pacing site set of coordinates of the second plurality of pacing site sets of coordinates corresponds to at least one second pacing integral;
    relating each of the pacing site sets of coordinates of the second plurality of pacing site sets of coordinates to a corresponding second pacing integral, whereby a plurality of second patient-specific regression coefficients are obtained;
    determining a second estimated set of coordinates of the origin of the idiopathic ventricular arrhythmia based on the integral of the electrocardiogram segment of the idiopathic ventricular arrhythmia and the second plurality of patient-specific regression coefficients;
    projecting the second estimated set of coordinates of the origin of the idiopathic ventricular arrhythmia onto the at least partial electroanatomical geometry of the patient, whereby a second map of the origin of the idiopathic ventricular arrhythmia is obtained; and
    providing the second map of the origin of the idiopathic ventricular arrhythmia.

7. The method of claim 1, wherein the origin of the idiopathic ventricular arrhythmia is in a right ventricle of the patient.

8. The method of claim 1, wherein the acquiring the at least partial electroanatomical geometry comprises acquiring the at least partial electroanatomical geometry intraprocedurally.

9. The method of claim 1, wherein the calculating the at least one pacing integral for each of the pacing electrocardiogram segments of the plurality of pacing electrocardiogram segments comprises calculating at least one 120-ms QRS integral for each of the pacing electrocardiogram segments of the plurality of pacing electrocardiogram segments.

10. The method of claim 1, wherein the relating comprises modeling using multiple regression.

11. A system for intraprocedurally identifying a location of an origin of an idiopathic ventricular arrhythmia in a patient, the system comprising electronic persistent storage and at least one electronic processor communicatively coupled to the electronic persistent storage, the electronic persistent storage comprising instructions that, when executed by the at least one electronic processor, configure the at least one electronic processor to perform operations comprising:
    acquiring an at least partial electroanatomical geometry of the patient;

acquiring an electrocardiogram segment of the idiopathic ventricular arrhythmia of the patient;

calculating at least one integral of the electrocardiogram segment of the idiopathic ventricular arrhythmia;

acquiring a plurality of pacing site sets of coordinates obtained by an intracardiac instrument for the patient;

acquiring a plurality of pacing electrocardiogram segments of the patient, each pacing site set of coordinates of the plurality of pacing site sets of coordinates corresponding to at least one pacing electrocardiogram segment of the plurality of pacing electrocardiogram segments;

calculating at least one pacing integral for each of the pacing electrocardiogram segments of the plurality of pacing electrocardiogram segments, whereby each pacing site set of coordinates of the plurality of pacing site of sets coordinates corresponds to at least one pacing integral;

relating each pacing site set of coordinates of the plurality of pacing site sets of coordinates to at least one corresponding pacing integral, whereby a plurality of patient-specific regression coefficients are obtained, wherein the patient-specific regression coefficients link pacing site location coordinates to electrocardiogram integrals;

determining an estimated set of coordinates of the origin of the idiopathic ventricular arrhythmia based on at least one integral of the electrocardiogram segment of the idiopathic ventricular arrhythmia of the patient and on the plurality of patient-specific regression coefficients;

projecting the estimated set of coordinates of the origin of the idiopathic ventricular arrhythmia on to the at least partial elect roan atomical geometry of the patient, whereby a map of a location of the origin of the idiopathic ventricular arrhythmia is obtained; and providing the map of a location of the origin of the idiopathic ventricular arrhythmia.

12. The system of claim 11, wherein the acquiring the plurality of pacing electrocardiogram segments of the patient comprises acquiring the plurality of pacing electrocardiogram segments obtained using only three electrocardiogram leads.

13. The system of claim 12, wherein the only three electrocardiogram leads consist of one of: a III lead, a V2 lead, and a V6 lead; or a III lead, a V1 lead, and V4 lead; or Frank leads X, Y, Z.

14. The system of claim 12, wherein the acquiring the plurality of sets of pacing site sets of coordinates comprises acquiring no more than five pacing site sets of coordinates.

15. The system of claim 11, further comprising a pace mapping system configured to ablate the origin of the idiopathic ventricular arrhythmia based on at least the map of the origin of the idiopathic ventricular arrhythmia.

16. The system of claim 11, wherein the operations further comprise: acquiring a second plurality of pacing site sets of coordinates for the patient, the second plurality of pacing site sets of coordinates comprising a set of coordinates corresponding to the estimated set of coordinates of the origin of the idiopathic ventricular arrhythmia;

acquiring a second plurality of pacing electrocardiogram segments for the patient, each pacing site set of coordinates of the second plurality of pacing site sets of coordinates corresponding to at least one pacing electrocardiogram segment of the second plurality of pacing electrocardiogram segments;

calculating a second pacing integral for each of the pacing electrocardiogram segments of the second plurality of pacing electrocardiogram segments, whereby each pacing site set of coordinates of the second plurality of pacing site sets of coordinates corresponds to at least one second pacing integral;

relating each of the pacing site sets of coordinates of the second plurality of pacing site sets of coordinates to a corresponding second pacing integral, whereby a plurality of second patient-specific regression coefficients are obtained;

determining a second estimated set of coordinates of the origin of the idiopathic ventricular arrhythmia based on the integral of the electrocardiogram segment of the idiopathic ventricular arrhythmia and the second plurality of patient-specific regression coefficients; and projecting the second estimated set of coordinates of the origin of the idiopathic ventricular arrhythmia onto the at least partial electroanatomical geometry of the patient, whereby a second map of the origin of the idiopathic ventricular arrhythmia is obtained.

17. The system of claim 11, wherein the origin of the idiopathic ventricular arrhythmia is in a right ventricle of the patient.

18. The system of claim 11, wherein the acquiring the at least partial electroanatomical geometry comprises acquiring the at least partial electroanatomical geometry intraprocedurally.

19. The system of claim 11, wherein the calculating the at least one pacing integral for each of the pacing electrocardiogram segments of the plurality of pacing electrocardiogram segments comprises calculating at least one 120-ms QRS integral for each of the pacing electrocardiogram segments of the plurality of pacing electrocardiogram segments.

20. The system of claim 11, wherein the relating comprises modeling using multiple regression.

* * * * *